UNITED STATES PATENT OFFICE.

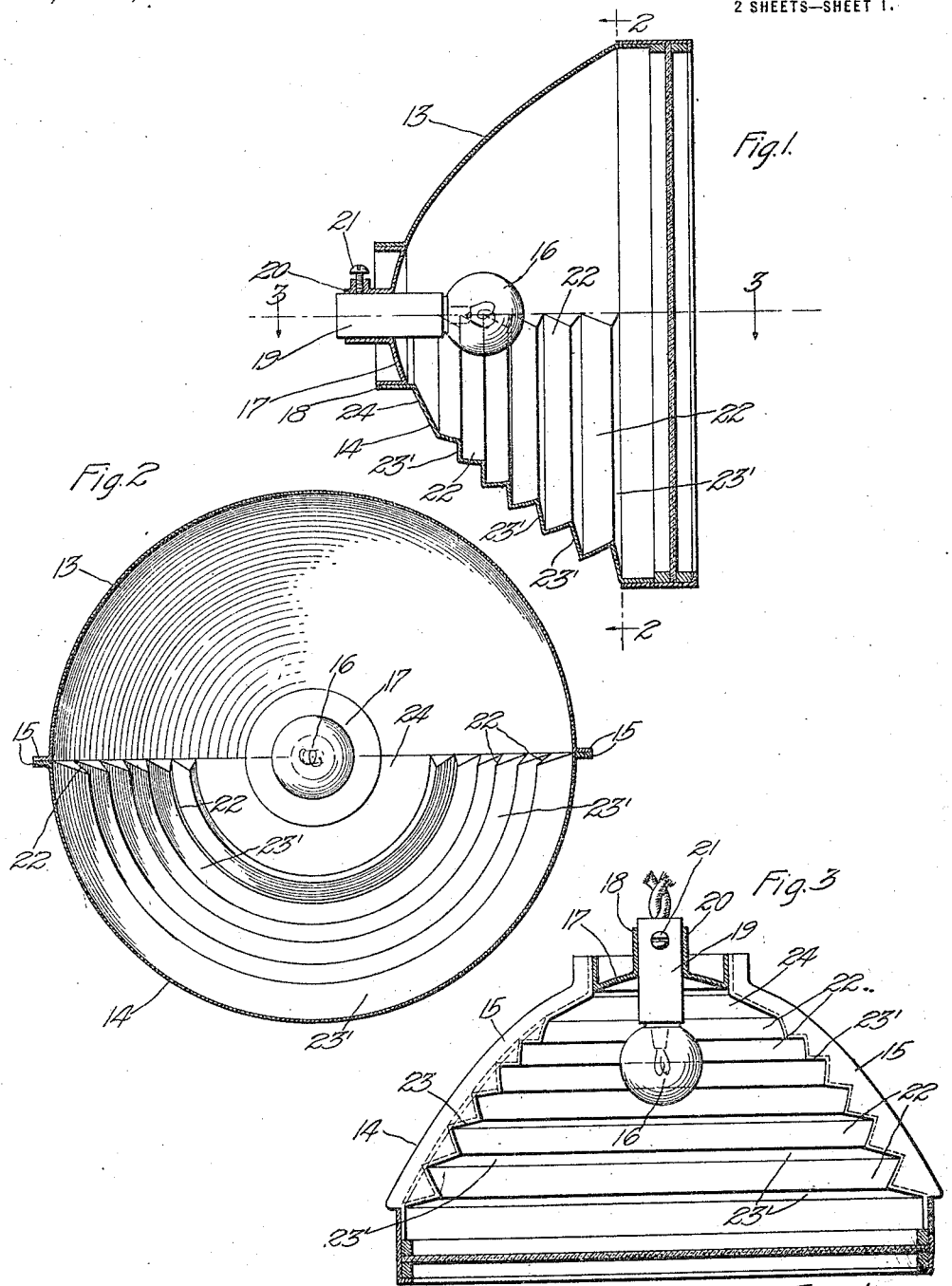

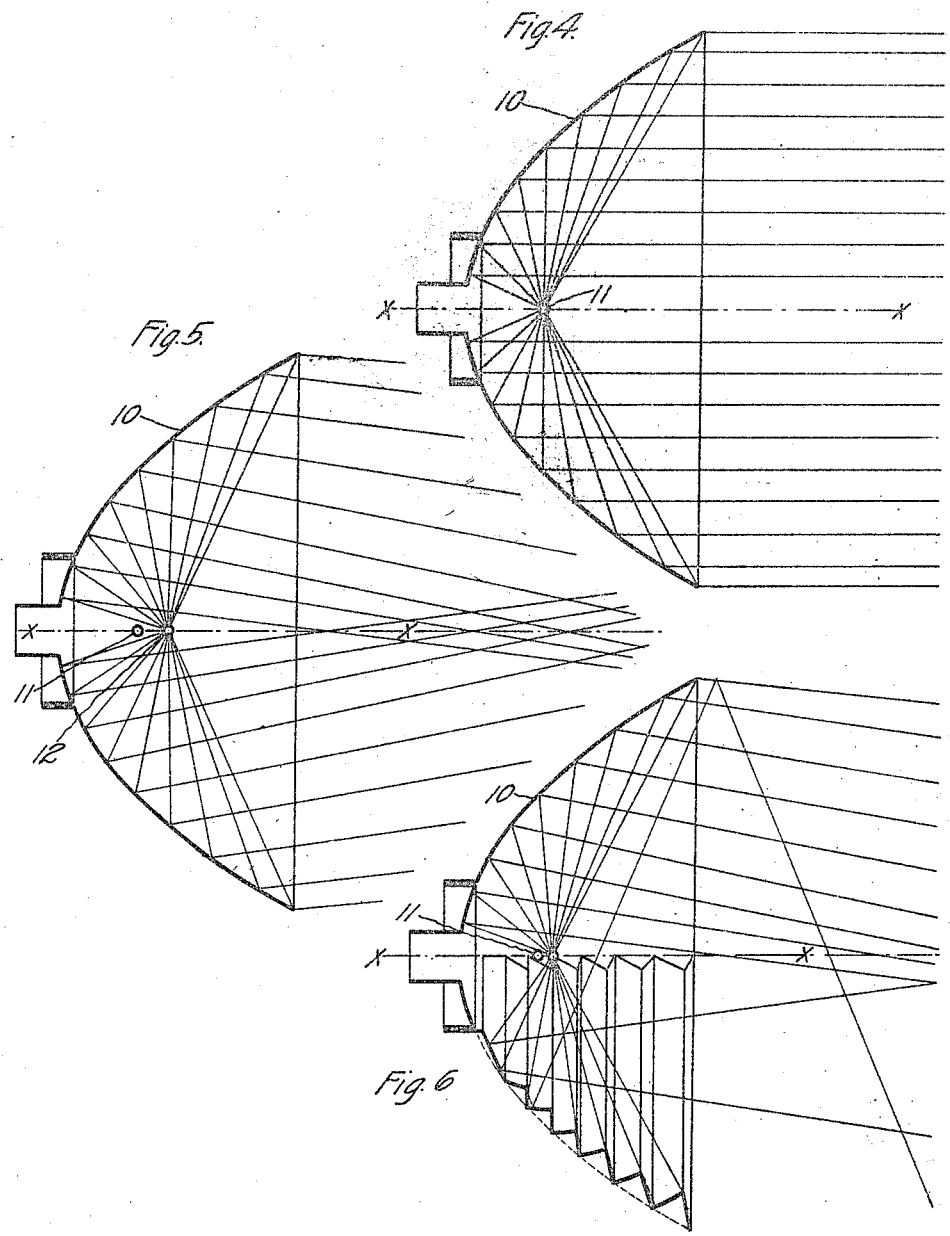

CHARLES E. POST AND PAUL G. WAGNER, OF LOS ANGELES, CALIFORNIA.

NON-GLARING HEADLIGHT.

1,189,621.      Specification of Letters Patent.      Patented July 4, 1916.

Application filed March 27, 1916. Serial No. 87,047.

*To all whom it may concern:*

Be it known that we, CHARLES E. POST and PAUL G. WAGNER, citizens of the United States, residing at Los Angeles, in the county of Los Angeles and State of California, have invented new and useful Improvements in Non-Glaring Headlights, of which the following is a specification.

Our invention relates to a non-glare headlight.

The ordinary headlight of motor driven vehicles is objectionable because of its blinding glare to approaching pedestrians and vehicles, and the danger resulting therefrom.

Many municipalities have passed ordinances requiring that the lights of motor driven vehicles shall be so directed that the center rays thereof shall strike the ground within a distance of 75 feet from the front thereof, or the light shall be so dimmed as to eliminate all glare therefrom. The immediate result of such municipal ordinances was the invention of so-called dimmers adapted to be applied to the headlight and whose purpose it was to eliminate the objectionable glare. The many defects of practically all dimmers now in use is twofold: First, they are inoperative except when applied to certain makes of headlights; secondly they are inefficient because they reduce the light thrown out by the headlight.

There are some headlights in use at the present time which emit the objectionable glare even after the application of every kind of dimmer. It is for this reason that the above municipal ordinances are, as a rule, not strictly enforced. The true source of the difficulty seems not to have been realized by the inventors devising dimmers of various kinds. If it were feasible to construct a headlight having a parabolic reflector mathematically true, on a commercial scale, the question would be easily solved. However, it is impossible to so construct the parabolic reflector at a price at which the headlights must necessarily be sold. The reflecting surfaces of the headlights are not truly parabolic, and consequently rays of light reflected from either the lower or the upper half thereof will be thrown in all directions, causing the objectionable glare.

It is an object of this invention to construct the reflector of the headlight in such a manner that all the rays of light thrown upon the road will come from the upper half thereof and be projected in a forward and slightly downward direction, striking the ground at approximately 75 feet in front of the vehicle. The reflector is so constructed that practically all the rays falling upon the lower half thereof are reflected upon the same path in which they came to the source of light thence to the upper half of the reflector and thence downwardly and outwardly. We have found by careful tests that the efficient illumination of our non-glare headlight at 75 feet from the lamp is $88\frac{6}{10}$ per cent., while the nearest result of headlights equipped with the best dimmers known to us shows a maximum efficiency of only $55\frac{6}{10}$ per cent.

It is an object of our invention to construct a headlight in which the light is located slightly in advance on the axis of the parabola on which the deflector is constructed, and in which the upper half consists of a smooth polished metal surface while the lower half of the reflector is constructed of a plurality of adjacent deflector faces extending transversely to the axis of the parabola, said faces being segments of concentric spheres, whose center is the locus of the light.

With the above and other objects in view which will appear as the description proceeds, our invention consists in the construction, arrangement and combination of parts hereinafter described and claimed.

In the accompanying drawings which form a part of this specification, we have illustrated a convenient and practical embodiment of our invention, and in which:

Figure 1 is a vertical central section of our non-glare headlight. Fig. 2 is a vertical section taken on line 2—2 of Fig. 1. Fig. 3 is a central horizontal section taken on line 3—3, Fig. 1. Figs. 4, 5 and 6 are central vertical sections through the headlight showing the method of constructing the same.

Referring to Fig. 4 of the drawings, 10 indicates a parabola with 11 the focus thereof. A parabolic reflector, if the parabolic curve is mathematically correct would reflect the rays of light coming from the focus along lines parallel to the axis $x$. Since it is impossible to produce a true parabolic reflector on a commercial scale, the ordinary parabolic reflector has a good deal of objectionable glare due to reflected rays coming from the uneven surface thereof. For this reason, we advance the locus of the light to a point indicated at 12 in Fig. 5. This point is located on the axis and slightly in advance of the true focus 11. The rays of light coming from the point 12 will be reflected as indicated in Fig. 5 and converge as shown. The rays reflected from the upper half of the parabola strike the ground in front of the vehicle, but the rays reflected from the lower half, unless changed in their direction would be projected in an upward and forward direction, causing the objectionable glare. We therefore construct the lower half of the reflector with means whereby the light falling thereon will be so reflected that the path of reflection coincides with the path of incidence, and the reflected light will strike the upper half of the reflector, whence it will be reflected downwardly and forwardly in the same direction as the direct rays of light coming from the locus of light. It has been proposed hitherto to provide a small convex deflector adjacent to and below the locus of light, the purpose of such a deflector being to reflect the light falling upon it to the upper half. However, in view of the fact that the source of light is necessarily of appreciable size, and furthermore that the concave deflector, because of its small size would magnify any errors of its construction, the light deflected to the upper half did not coincide with the light coming directly from the locus of light and consequently a percentage of the deflected rays of light were reflected from the upper half of the reflector in a forward and upward direction, causing the objectionable eye glare. In our construction, the objectionable glare is eliminated and the light falling upon the lower half of the reflector is utilized for the useful road light.

Taking the locus of light, which as stated above is slightly in advance of the focus of the parabola, we construct from this point as a center, a series of concentric spheres as indicated in Fig. 6, and we select a suitable number of spherical portions extending transversely to the axis of the parabola, said portions being spaced from each other, but being so constructed that the light coming from said locus of light will find a continuous deflector surface. From this construction, it will be understood that the rays of light coming from the locus will be reflected on their paths of incidence to said locus and passing beyond to the upper half of the parabolic reflector will be projected in the same way as the rays coming direct from the said locus.

Referring now to Figs. 1, 2 and 3, the headlight comprises an upper and a lower half, the upper half 13 being of ordinary polished metal. The lower half 14, whose general contour is parabolic, is composed of deflector faces or plates, hereinafter to be described. The two halves 13 and 14 of the reflector are fastened together by means of co-acting flanges 15, 15. The source of light 16 which may be the ordinary electric incandescent lamp, is adjustably mounted in a lamp carrier plate 17, said plate being circular and detachably mounted in an aperture 18 provided in the apex of the reflector. The carrier rod 19 of the lamp 16 is slightly mounted in a neck 20 of the lamp carrier plate. A set screw 21 on said neck clamps the rod 19 in adjusted position. The outer face of the carrier plate 17 is preferably frosted. The deflector plates 22 are portions of the concentric sphere, whose center is the locus of the light 16. These plates extend transversely to the axis of the reflector, and are arranged in stepped relation, each pair of adjacent deflector plates being connected by a wall 23'. These walls are substantially in radial planes, which pass through the locus of the light, the object being to prevent any light coming directly from the lamp falling thereon. In practice, the lower half of the deflector is stamped out of one piece of metal by means of a die. Using a die for stamping out the deflector plates necessitates that the connecting wall 23' which connects the first pair of deflector plates nearest the apex of the reflector, is not in a plane radial to the locus of the light. A marginal portion 24 in the lower half of the deflector between the lamp supporting plate 17 and the first pair of deflector plates is provided, which is slightly inclined from the true parabola. Any light falling on the margin 14 and the wall 23' from the lamp will be reflected upwardly and outwardly, issuing from the extreme upper half of the headlight. Such rays of light will not be objectionable, as they will not strike an approaching vehicle or pedestrian.

From the foregoing description, the operation of our non-glare headlight will be easily understood. The electric lamp 16 is placed in the locus which forms the center of the spheres on which the deflector plates 22 are taken. When in its adjusted position, the same is clamped in place by means of the set screw 21. The light falling from the deflector plates will be reflected on their paths of incidence to the upper half of the reflector, whence they will be reflected in conjunction with the rays of light coming directly from the light in a forward and downward direction, producing the so-called road light.

While we have shown the preferred embodiment of our invention, it will be understood that we do not desire to confine ourselves to the specific details of construction, arrangement and combination of parts as shown, as various changes may be made by those skilled in the art without departing from the spirit of our invention as claimed.

I claim:

1. In a non-glare headlight, the combination of a parabolic reflector having its upper half smooth and its lower half containing a plurality of concave deflector plates, said plates being portions of concentric spheres whose center is a point on the axis of the parabola slightly in advance of the focus thereof, and a light located at said point.

2. In a non-glare headlight, the combination of a parabolic reflector having its upper half smooth, and its lower half comprising a plurality of concave deflector plates extending transversely to the axis of the parabola, said plates being portions of concentric spheres whose center is a point on the axis of the parabola slightly in advance of the focus thereof and a light located at said point.

3. In a non-glare headlight, the combination of a parabolic reflector, the upper half thereof being smooth, the lower half comprising a plurality of concave deflector plates extending transversely to the axis of the parabola, said plates being segments of concentric spheres whose center is a point on the axis of the parabola slightly in advance of the focus thereof, a removable lamp carrying member in the apex of the reflector, a lamp adjustably carried by said member and adapted to be located at said point, and means for locking said lamp in adjusted position.

4. In a non-glare headlight, the combination of a parabolic reflector, the upper half thereof being smooth, the lower half comprising a plurality of concave deflector plates extending transversely to the axis of the parabola, said plates being segments of concentric spheres, whose center is a point on the axis of the parabola slightly in advance of the focus thereof, each pair of adjacent deflector plates being joined by a wall lying substantially in a plane passing through said center, a removable lamp carrying plate at the apex of said reflector, said removable plate having its outer face frosted, a lamp adjustably carried by said removable plate and adapted to be located at said point and means for locking said lamp in adjusted position.

In testimony whereof we have signed our names to this specification.

CHARLES E. POST.
PAUL G. WAGNER.